(12) United States Patent
Watson et al.

(10) Patent No.: US 6,506,357 B2
(45) Date of Patent: *Jan. 14, 2003

(54) SULPHUR RECOVERY

(75) Inventors: Richard William Watson, Near Ilkley (GB); Stephen Rhys Graville, Sheffield (GB)

(73) Assignee: The BOC Group plc, Surrey (GB)

( * ) Notice: Subject to any disclaimer, the term of this patent is extended or adjusted under 35 U.S.C. 154(b) by 110 days.

This patent is subject to a terminal disclaimer.

(21) Appl. No.: 09/731,208

(22) Filed: Dec. 6, 2000

(65) Prior Publication Data

US 2001/0003577 A1 Jun. 14, 2001

(30) Foreign Application Priority Data

Dec. 10, 1999 (GB) .............................. 9929330

(51) Int. Cl.$^7$ ........................ B01D 53/52; B01D 53/58; C01B 17/04
(52) U.S. Cl. .................. 423/573.1; 423/237; 423/576.8
(58) Field of Search .............................. 423/237, 573.1, 423/576.8

(56) References Cited

U.S. PATENT DOCUMENTS

| | | | |
|---|---|---|---|
| 4,035,158 A | 7/1977 | Scott et al. | 23/278 |
| 4,391,790 A * | 7/1983 | Palm | 423/574 R |
| 5,139,764 A | 8/1992 | Szekely | 423/574 R |
| 6,352,680 B1 * | 3/2002 | Watson et al. | 423/573.1 |

FOREIGN PATENT DOCUMENTS

| | | | |
|---|---|---|---|
| DE | 33 35 931 A1 * | 4/1985 | ............. 423/576.8 |
| DE | 197 18 261 A1 | 11/1998 | |
| EP | 0 034 848 B1 | 9/1981 | |
| EP | 0 325 286 A3 | 7/1989 | |
| EP | 0 974 552 A3 | 1/2000 | |
| EP | 0 974 552 A2 | 1/2000 | |
| WO | WO 88/02350 | 4/1988 | |
| WO | WO 96/26157 | 8/1996 | |

* cited by examiner

Primary Examiner—Steven Bos
Assistant Examiner—Timothy C. Vanoy
(74) Attorney, Agent, or Firm—Philip H. Von Neida; Salvatore P. Pace

(57) ABSTRACT

Sulphur is recovered from a first gas stream comprising hydrogen sulphide and at least 50% by volume of ammonia and from a second gas stream comprising hydrogen sulphide but essentially no ammonia, the first gas stream, the second gas stream, and combustion supporting gas comprising at least one stream of essentially pure oxygen or oxygen-enriched air are fed to a single combustion zone or a plurality of combustion zones in parallel with each other without premixing of first gas stream or the second gas stream with oxygen or air, and creating in the or each combustion zone at least one region in which thermal cracking of ammonia takes place, and taking from the reactor an effluent gas stream including sulphur vapor, sulphur dioxide, and hydrogen sulphide, but essentially no residual ammonia.

5 Claims, 3 Drawing Sheets

SULPHUR RECOVERY

FIELD OF THE INVENTION

This invention relates to recovering sulphur from a gas stream comprising ammonia and hydrogen sulphide.

BACKGROUND OF THE INVENTION

Waste gas streams comprising hydrogen sulphide and ammonia are frequently encountered in refineries. Because hydrogen sulphide and ammonia are poisonous gases such waste gas streams need to be appropriately treated before being discharged to the atmosphere. Although such gas streams can be employed as a feed stream to the Claus process, care has to be taken to ensure that all the ammonia is destroyed upstream of the catalytic stages of the process because residual ammonia tends to react with sulphur dioxide to form ammonium salts which will block or poison the catalyst. These problems tend to increase in severity with increasing ammonia concentration in the waste gas stream.

As a result, particularly if the ammonia concentration in the waste gas stream is in excess of 30% by volume, the practice in the art is to employ two separate combustion zones at the front end of the Claus process. All the waste gas stream comprising ammonia and hydrogen sulphide is fed to an upstream combustion zone. The waste gas stream is typically mixed with one part of another waste gas stream comprising hydrogen sulphide but essentially no ammonia. The rest of the other waste gas stream is supplied to a downstream combustion zone. Accordingly any ammonia which is not destroyed in the upstream combustion zone will tend to be incinerated in the downstream combustion zone. Such processes are, for example, disclosed in WO-A-88/02350 and EP-A-0 325 286.

EP-B-0 034 848 discloses destroying the ammonia content of a waste gas stream by supplying the gas stream to the outer of two concentric tubes forming part of a burner. A hydrogen sulphide stream free of ammonia is supplied to the inner concentric tubes. The two tubes debouch into a mixing chamber, of which the downstream end terminates in a combustion chamber. Although only a single combustion zone is nominally employed, difficulties arise in the fabrication and operation of the mixing chamber such the high temperatures created do not damage it. The reason for employing the mixing chamber is to ensure that the gases to be burned are thoroughly mixed with combustion—supporting air upstream of the combustion chamber. Intimate mixing is deemed to be necessary to ensure that all the ammonia is destroyed by combustion.

SUMMARY OF THE INVENTION

We have discovered that the thermal dissociation of ammonia to nitrogen and hydrogen can play an important part in its destruction. Accordingly, provided an adequately high temperature region or regions within the flame zone can be created for the thermal cracking of ammonia it is not necessary either to employ two separate combustion or flame zones or, in the case of a single flame zone, to employ a discrete mixing chamber upstream thereof.

According to the present invention there is provided a method of recovering sulphur from a first gas stream comprising hydrogen sulphide and at least 50% by volume of ammonia and from a second gas stream comprising hydrogen sulphide but essentially no ammonia, including feeding the first gas stream, the second gas stream, and combustion supporting gas comprising at least one stream of essentially pure oxygen or oxygen-enriched air to a single combustion zone or a plurality of combustion zones in parallel with each other within a reactor without premixing of combustible gas with oxygen or air, and creating in the or each combustion zone at least one region in which thermal cracking of ammonia takes place, and taking from the reactor an effluent gas stream including sulphur vapour, sulphur dioxide, and hydrogen sulphide, but essentially no residual ammonia.

If desired a single burner or a plurality of burners may fire into the or each combustion zone.

The method according to the invention is particularly suitable for use if the first gas stream contains at least 60% by volume of ammonia.

Preferably, there is fed to the or each combustion zone in addition to the stream or streams of essentially pure oxygen or oxygen-enriched air a stream or streams of air. Such an arrangement facilitates the creation of a relatively hot thermal cracking zone or zones within the combustion zone without exceeding a maximum temperature for the effluent gas stream above which thermal damage is liable to be caused to the reactor even if the normal precaution of providing the reactor with an internal refractory lining is taken.

Preferably, the or each combustion zone has at least three stages. In one arrangement of a burner for use in the method according to the invention to create a combustion zone having at least three stages, a first flow of the first gas stream is preferably supplied to the flame from a first region of the mouth of the burner; at least one second flow of a combustion supporting gas is caused to issue from the mouth of the burner and mix in the flame with the first gas stream; at least one third flow of the second gas stream is supplied to the flame from a second region of the mouth of the burner surrounding and spaced from the first region; at least one fourth flow of a combustion supporting gas is caused to issue from the mouth of the burner the and mix in the flame with the second gas stream, and at least one fifth flow of a combustion supporting gas of different composition from the second and fourth flows is caused to mix in the flame with the second gas stream. Burning the first and second gas streams in three stages, typically an innermost stage, an outermost stage, and an intermediate stage, makes it possible to achieve a relatively low temperature in the outermost stage in comparison with a temperature in excess of 2000° C. in the innermost stage. Such a high temperature in the innermost stage facilitates destruction of the ammonia in the first gas stream.

Preferably the flame extends generally longitudinally within the furnace. The furnace is typically disposed with its longitudinal axis horizontal, and therefore the burner is typically also disposed with its longitudinal axis extending horizontally. Such arrangements can help to keep down the risk of damage to any refractory lining employed in the furnace.

The second and fourth flows of combustion supporting gas preferably both have a mole fraction of at least 0.22 and may be oxygen-enriched air containing at least 50% by volume of oxygen or pure oxygen. The third oxidising gas is preferably atmospheric air neither enriched in nor depleted of oxygen, although enrichment up to 25 or 30% by volume of oxygen, or higher depending on the composition of the first and second gas streams, is generally acceptable.

Mixing of the first gas stream with the first combustion supporting gas is preferably facilitated by directing at least some of the first combustion supporting gas along a path or paths which meet a path or paths followed by the first gas streams. Accordingly, the second outlet or at least some of the second group of outlets preferably each have an axis which extends at an angle to the axis of the first outlet or the axes of at least some of the second group of outlets. The angle is preferably in the range of 10 to 30°. Preferably, the flow of the first gas stream is axial and the flow of the first combustion supporting gas is at an angle to the axis of the burner. The combustible gas stream and the first gas stream may be supplied at the same velocity as one another or at different velocities.

Alternatively, mixing of the first gas stream with the first combustion supporting gas can be facilitated by directing at least some of the first combustion supporting gas at a first linear velocity along a path or paths generally contiguous and generally parallel to a paths or paths followed by the first combustible gas at a second linear velocity, and one of the first and second linear velocities is from 25 to 150% (and preferably from 25 to 100%) greater than the other thereof. Mixing is facilitated because the differential velocity between the first combustion supporting gas and the first gas stream creates forces of shear therebetween. Preferably, it is the first linear velocity which is selected to be a greater of the two velocities. This arrangement facilitates design of the furnace to ensure that all the ammonia is destroyed in it. A further alternative or additional means for facilitating mixing of the first gas stream of the first oxidising gas is to impart a swirling motion to one or both of the streams. Devices which are able to impart swirl to such gas are well known.

The natural curvarture of the flame tends to facilitate mixing of the forth flow of second oxidising gas with the third flow of the second gas stream. Nevertheless, it is preferred to arrange the supply of the said third and fourth flows so as further to facilitate mixing. Similar means to those described above with reference to the first and second flows can therefore be used.

A particular advantage of the method according to the invention is that any oxides of nitrogen formed in the innermost or other oxygen rich stage of the flame will be reduced back to nitrogen with the result that the effluent gas stream is essentially free of oxides of nitrogen.

BRIEF DESCRIPTION OF THE INVENTION

The method according to the invention will now be described by way of example with reference to the accompanying drawings, in which.

DETAILED DESCRIPTION OF THE INVENTION

Figure 1:
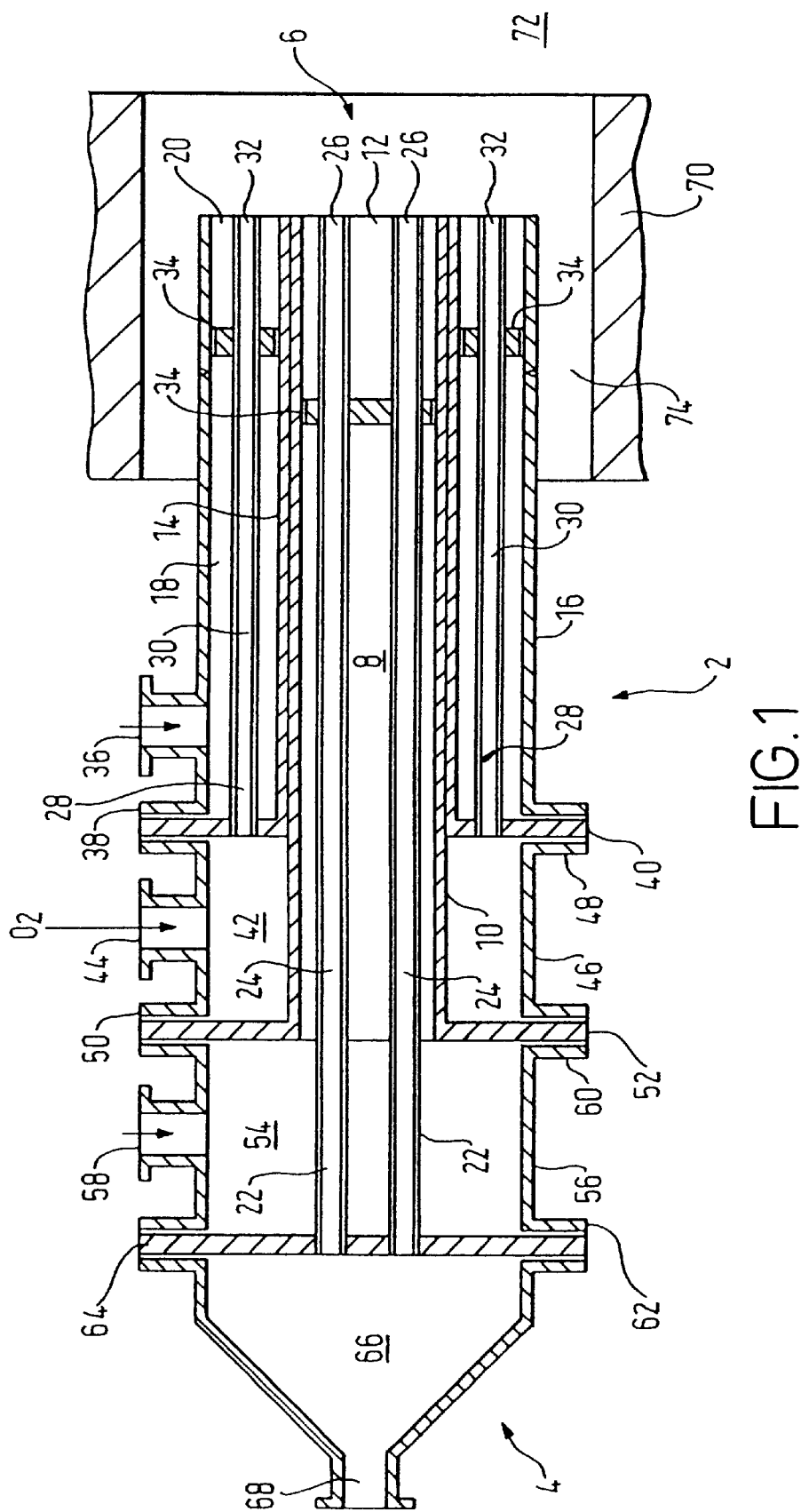
FIG. 1 is a schematic section al side elevation of a burner for use of a method according to the invention.
Figure 2:
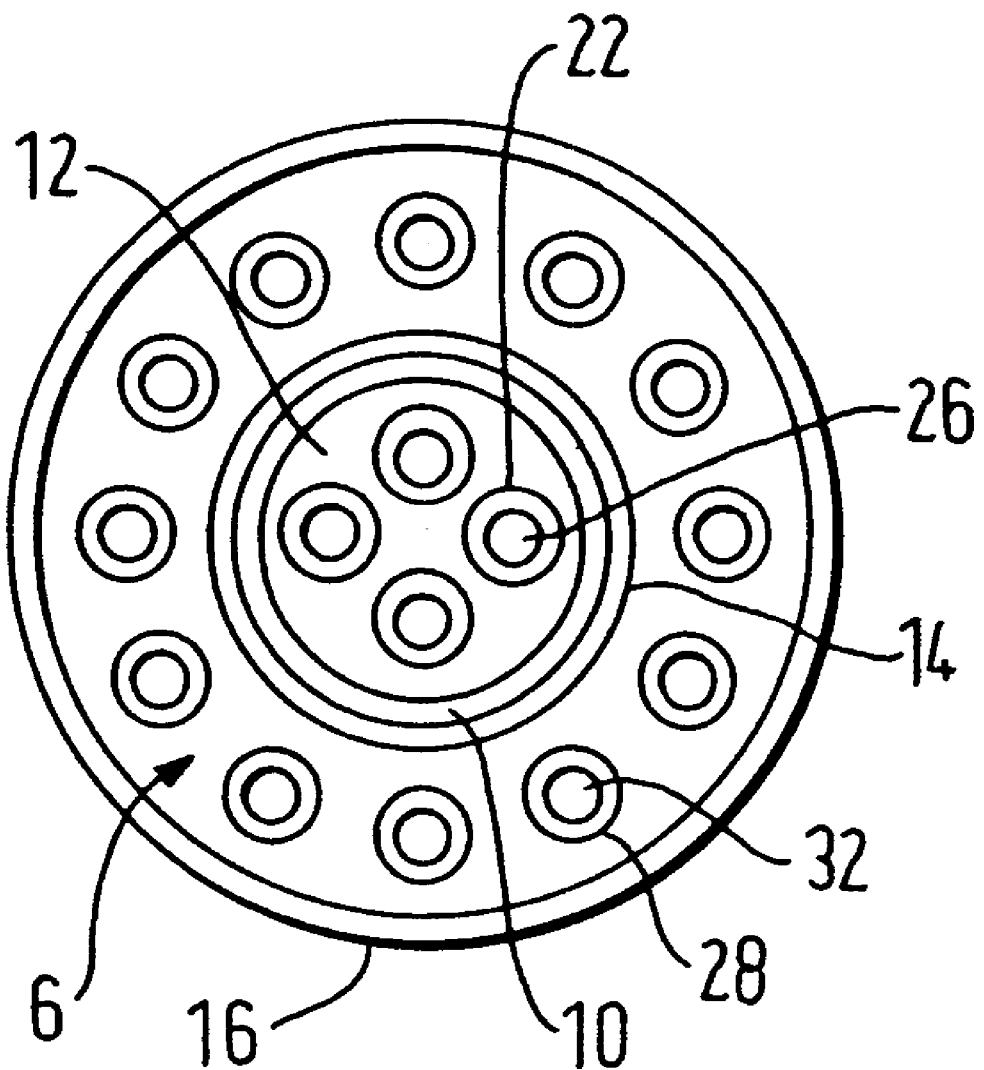
FIG. 2 is a schematic end view of the mouth of the burner shown in FIG. 1.

Referring to FIGS. 1 and 2 of the drawings, a burner 2 is of generally cylindrical shape and has a proximal end 4 and a distal end (or mouth) 6. The burner 2 has a central passageway 8 defined by an innermost tube 10 for flow of a first combustible gas stream comprising hydrogen sulphide. The longitudinal axis of the burner 2 is coincident with the longitudinal axis of the tube 10. The central passageway 8 has a first outlet 12 at its distal end. A second tube 14 is coaxial with the first tube 10. The inner surface of the tube 14 makes a frictional engagement with the outer surface of the tube 10. (Alternatively the tubes 10 and 14 may be joined to one another by means of an internal flange or welded connection.) A third tube 16 is spaced from and is coaxial with the tube 14. Tubes 14 and 16 define a second, annular, passageway 18 for a second flow of combustible gas mixture comprising hydrogen sulphide terminating at its distal end in an outlet 20 for the second combustible gas mixture. The tubes 14 and 16 terminate in the same plane as the tube 10.

An array of tubes 22 extends from beyond the proximal end of the tube 10 therethrough and defines passages 24 for the flow of a first oxidising gas mixture. Each passageway 24 has an outlet 26. (These outlets are termed "the second group of outlets" hereinabove.) The tubes 22 terminate in the same plane as the tube 10. The outlets 26 are typically disposed in a ring which is coaxial with the longitudinal axis of the burner 2.

A second array of tubes 28 is disposed in the passageway 18 defined by the tubes 14 and 16. Each tube 28 each defines a passageway 30 for a second flow of oxidising gas terminating in respective outlet 32. The tubes 28 each terminate in the same plane as the tube 10. The outlets 30 of the tubes 28 are arranged in a ring which is coaxial with the longitudinal axis of the burner 2. The respective tubes 22 and 28 may each be provided with a spider 34 to help support them when the burner is disposed with its longitudinal axis horizontal as shown in FIG. 1. There is considerable flexibility in selecting the actual numbers of the tubes 22 and 28.

The construction of the burner 2 so as to enable to the respective flows of first and second gas streams and combustion-supporting gas to be supplied to it is relatively simple. The outer tube 16 is provided with a first port 36 for the flow of the second combustible gas mixture comprising hydrogen sulphide. The proximal end of the outer tube 16 is formed with a flange 38 integral therewith or welded thereto. The flange 38 is bolted or otherwise secured to a similar flange 40 which is integral with or welded to the tube 14. If desired, a gasket or other sealing member (not shown) can be engaged between the flanges 40 and 38 so as to ensure a fluid-tight seal therebetween. The flange 40 forms the distal end of a chamber 42 which receives the second oxidising gas and which has a port 44 enabling it to be placed in communication with a source of such oxidising gas. The proximal ends of the tubes 28 are all received fluid-tight in complementary apertures through the flange 40. Thus, the tubes 26 communicate with the chamber 42. The chamber 42 has an outer wall 46, in which the port 44 is formed, which is provided at its distal end with a flange 48 which is fastened fluid-tight to the flange 40 and at its proximal end with a flange 50. The flange 50 is bolted or otherwise secured fluid-tight to a complementary flange 52 which is integral with or is welded to the proximal end of the tube 10. The flange 52 forms a proximal wall of the chamber 42. It also forms a distal wall of a further chamber 54 having a side wall 56 with a port 58 formed therein which enables the chamber 54 to be placed in communication with a source of the first combustible gas. The wall 56 of the chamber 54 has a first flange 60 at its distal end which is bolted or otherwise secured fluid-tight to the flange 52 and a second flange 62 at its proximal end which is bolted or otherwise secured fluid-tight to an end plate 64 which forms a dividing wall between the chamber 54 and a yet further chamber 66 for the first oxidising gas mixture and which receives fluid-tight in apertures formed therethrough the proximal ends of the tubes 22 so as to enable these tubes to receive a flow of the first oxidising gas mixture. The chamber 66 is provided with a port 68 which is coaxial with the longitudinal axis of the burner 2 and is able to be placed in communication with the source of the first oxidising gas mixture.

As shown in FIG. 1, the distal end 6 of the burner 2 extends into a port or quarl 70 of a furnace 72 for the partial combustion of hydrogen sulphide. An annular passage is defined between the distal end of the burner 2 and the port 70. Air is supplied to this passage 74 as a third oxidising gas.

If desired, the distal end of the outer tube 16 may be formed of a refractory metal. Other parts of the burner 2 may be formed of stainless steel.

In operation, the first gas stream, which comprises a mixture of hydrogen sulphide, ammonia, carbon dioxide and water vapour containing at least 50% by volume of ammonia, exiting the burner 2 from the outlet 12 becomes intimately mixed with the first oxidising gas that leaves through the outlets 26 to form a first stage of a flame. Similarly, the flow of the second gas stream, which comprises a mixture of hydrogen sulphide, carbon dioxide and water vapour (but no ammonia), leaving the burner 2 through the outlet 20 becomes intimately mixed with the flow of the second oxidising gas which leaves the burner 2 through the outlets 32, thus forming a second stage of the flame. A third stage of the flame is formed by intimate mixing of the air passing through the passage 74 with the second gas stream leaving the burner 2 through the outlet 20.

Figure 3:
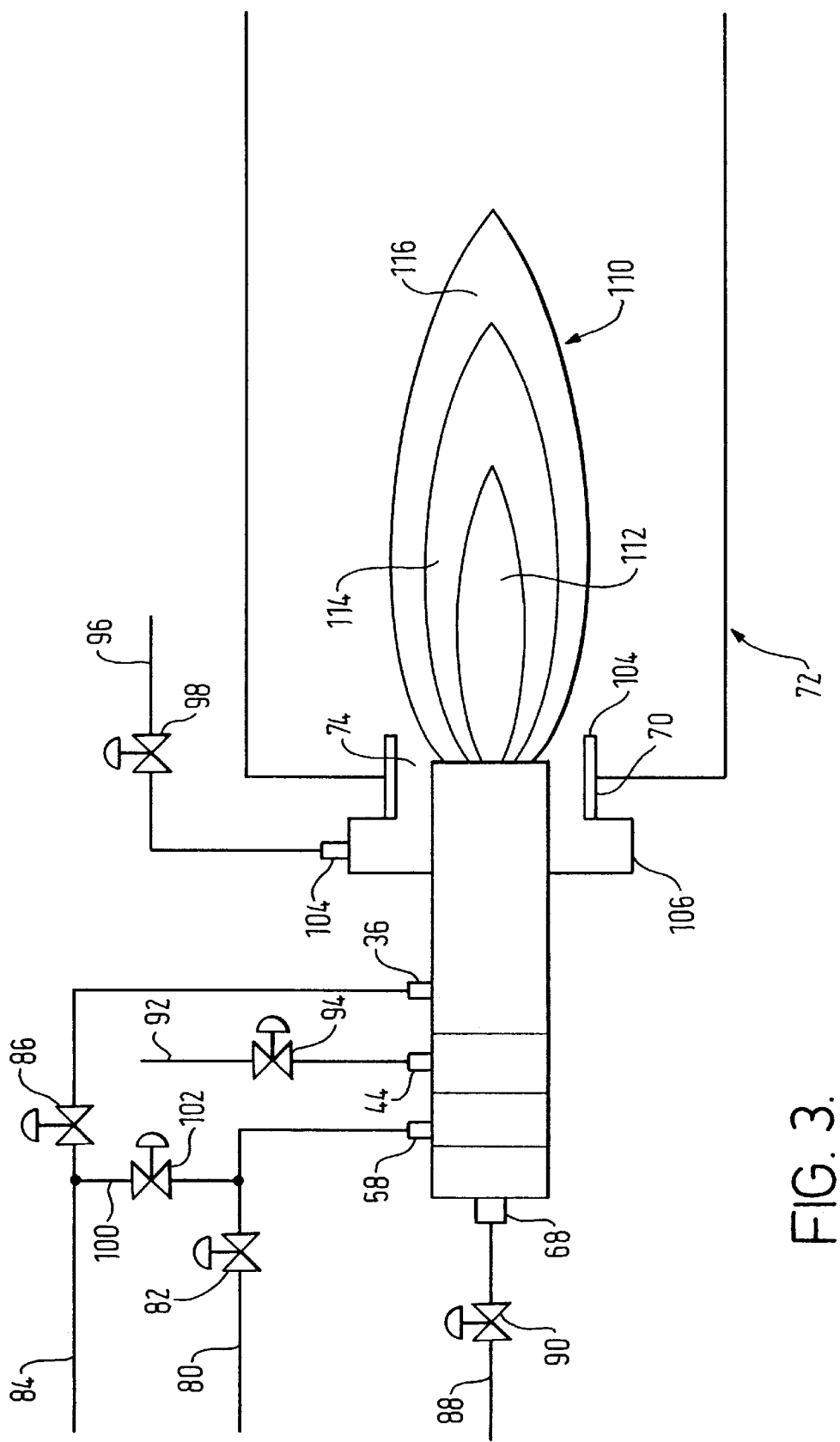
FIG. 3 is a schematic flow diagram illustrating apparatus for supplying combustible gas and oxidising gas to the burner shown in FIGS. 1 and 2.

An arrangement for supplying different gas flows to the burner 2 is shown in FIG. 3. Referring to FIG. 3, a first pipeline 80 for sour water stripper gas (which includes both hydrogen sulphide and ammonia) terminates in the port 58 of the burner 2. The first flow control valve 82 is disposed in the pipeline 80. A second pipeline 84 for amine gas (which predominantly comprises hydrogen sulphide) terminates in the port 36 of the burner 2 and has a second flow control valve 86 disposed therein. A third pipeline 88 communicating with a source (not shown) of first oxidising gas composed of air or oxygen-enriched air terminates in the port 68 of the burner 2. A third flow control valve 90 is located the third pipeline 88. A fourth pipeline 92 communicating with a source (not shown) of second oxidising gas composed of air or oxygen-enriched air terminates in the port 44 of the burner 2. A fourth flow control valve 94 is located in the fourth pipeline 92. A fifth pipeline 96 communicating with a blower (not shown) or other source of compressed air (neither enriched in nor depleted of oxygen) terminates in an inlet 104 to a nozzle 106 which communicates with the annular passage 74 defined between the ports 70 and the burner 2. The pipeline 96 has a fifth flow control valve 98 disposed therein. In addition, a pipeline 100 extends through a region of the second pipeline 84 upstream of the second flow control valve 86 to a region of the first pipeline 80 downstream of the first flow control valve 82. A sixth flow control valve 102 is disposed in the pipe 100.

In operation, the flow control valves described above may be set to determine the overall mole ratio of combustibles to oxygen supplied to the flame of the burner 2, so as to enable different local ratios of the reacting species to be created in different regions of the flame, so as to enable a hot innermost region to be maintained in the flame at a temperature typically in excess of 1700° C. in which zone both combustion and thermal reacting of ammonia takes place, so as to enable a much lower temperature to be maintained at the periphery of the flame, to create within a localised region of the flame conditions which favour thermal dissociation of hydrogen sulphide, and to ensure that all ammonia is destroyed. Typically, the rates of supply of the reactants are controlled such that the mole ratio of hydrogen sulphide to sulphur dioxide and the gas mixture leaving the furnace is approximately 2:1. Within the respective regions of the flame, however, the mole ratio of hydrogen sulphide to sulphur dioxide can vary significantly.

The kind of flame that is formed in operation of the burner is shown schematically in FIG. 3 and is indicated therein by the reference numeral 110. The flame has three stages 112, 114 and 116. The innermost stage 112 is a high intensity zone into which the first oxidising gas and the first combustible gas flow. The first oxidising gas is supplied at a rate in excess of the stoichiometric rate that would be required for the oxidation of all the ammonia and one third of the hydrogen sulphide supplied to the innermost stage. In fact, as mentioned below, some of the ammonia is destroyed by thermal cracking to nitrogen and hydrogen. Hydrocarbons in the first combustible gas and oxidation of more than one third of the hydrogen sulphide. A high temperature in the innermost stage 112 is thus ensured. The temperature can be controlled by the control valves 82, 90 and 102.

The intermediate stage 114 of the flame 110 receives the second oxidising gas and part of the second gas stream. This stage 114 is typically operated oxygen-poor that is to say that the relative rates of supply of hydrogen sulphide and oxygen molecules to this stage are such that less than one third of this hydrogen sulphide is oxidised to sulphur dioxide. The paucity of oxygen in this region together with the heat radiated from the inner stage 106 favour formation of sulphur vapour by thermal cracking of hydrogen sulphide. Since the thermal cracking of hydrogen sulphide proceeds endothermically, it provides a mechanism for moderating flame temperature and helps to prevent excessive temperatures being created in the outermost stage 116. Further, it can reduce the demand for nitrogen molecules to moderate the flame temperature, and thereby enables the first and second oxidising gases to have higher mole fractions of oxygen than would otherwise be possible. The temperature can be controlled in the stage 108 by the rate of flow of the first combustible gas and by its mole fraction of oxygen. The third or outermost stage 116 of the flame receives the rest of the second combustible gas and the air which is supplied as the third oxidising gas to the pipeline 96. The rate of supply of air is controlled so as to ensure that an excessive flame temperature is not created in the stage on 116. The total supply of oxidant is controlled such that the desired ratio of $H_2S$ to $SO_2$ is maintained after the waste heat reboiler (not shown).

When the combined rates of supply of the first and second gas streams are at a specified maximum, typically the rates of supply of the oxidising gases are each at a maximum. If the total rate of supply of combustible gas falls, various control strategies are available to maintain suitable combustion conditions in the flame. Most simply, the control valves 94 and 98 may be reset to make a complementary reduction in the flow rate of the oxidising gases. In addition, means (not shown) may be provided in the apparatus shown in FIG. 3 for adjusting the mole fraction of oxygen in the first and second oxidising gases. For example, additional flow control valves (not shown) may be provided in pipes (not shown) which introduce commercially pure oxygen into the third and fourth pipelines 88 and 92, respectively. Thus, the mole fraction of the oxygen in the first and second oxidising gases may be controlled.

Referring again to FIGS. 1 and 2, it will be appreciated that all the gas streams leave the burner 2 substantially axially. Mixing between the first oxidising gas leaving the burner 2 through the outlets 26 and the first combustible gas leaving through the outlets 12 thereby takes place by virtue of shear between the respective gas streams. The degree of shear is enhanced by having a differential velocity between the first combustible gas and first oxidising gas. In one illustrative example, the velocity of the first oxidising gas leaving the burner 2 is 60 m/s and the velocity of the first combustible gas is 40 m/s.

Any $NO_x$ (oxides of nitrogen) formed in the innermost stage 114 or other region of the flame 110 is subsequently reduced again to nitrogen, particularly in the other stages of the flame which are reducing. Further, hydrogen formed by the thermal dissociation of ammonia tends to be oxidised to water vapour by reaction with oxygen in the flame 110.

We claim:

1. A method of recovering sulphur from a first gas stream comprising hydrogen sulphide and at least 50% by volume of ammonia and from a second gas stream comprising hydrogen sulphide but essentially no ammonia, including feeding the first gas stream, the second gas stream, and combustion supporting gas comprising at least one stream of air and at least one stream of essentially pure oxygen or oxygen-enriched air to a single combustion zone or a plurality of combustion zones in parallel with each other without premixing of said first gas stream or said second gas stream with oxygen or air, and thereby creating in the or each combustion zone at least one region in which thermal cracking of ammonia takes place, and taking from the reactor an effluent gas stream including sulphur vapour, sulphur dioxide, and hydrogen sulphide, but essentially no residual ammonia.

2. The method claimed in claim 1, wherein the first gas stream contains at least 60% by volume of ammonia.

3. The method claimed in claim 1, in which the or each combustion zone has at least three stages.

4. The method claimed in claim 1, wherein the combustion zone is maintained by operation of a burner, a first flow of the first gas stream being supplied to the combustion zone from a first region of the mouth of the burner, at least one second flow of a combustion supporting gas being caused to issue from the mouth of the burner and mix in the flame with the first gas stream, at least one third flow of the second gas stream being supplied to the flame from a second region of the mouth of the burner surrounding and spaced from the first region, at least one fourth flow of a combustion supporting gas being caused to issue from the mouth of the burner and mix in the flame with the second gas stream and at least one fifth flow of air also being caused to mix in the flame with the second gas stream.

5. The method claimed in claim 4, wherein the second and fourth flows of combustion supporting gas are both of oxygen-enriched air containing at least 50% by volume of oxygen, and the fifth flow of air is enriched in oxygen to contain up to 30% by volume of oxygen.

* * * * *